(12) United States Patent
Saito (10) Patent No.: US 7,537,178 B2
(45) Date of Patent: May 26, 2009

(54) SPINNING REEL

(75) Inventor: Kei Saito, Osaka (JP)

(73) Assignee: Shimano Inc., Osaka (JP)

( * ) Notice: Subject to any disclaimer, the term of this patent is extended or adjusted under 35 U.S.C. 154(b) by 0 days.

(21) Appl. No.: 11/834,327

(22) Filed: Aug. 6, 2007

(65) Prior Publication Data

US 2008/0173743 A1  Jul. 24, 2008

(30) Foreign Application Priority Data

Aug. 31, 2006   (JP)   ............... 2006-234876

(51) Int. Cl.
*A01K 89/01* (2006.01)
(52) U.S. Cl. ..................... 242/282; 74/545
(58) Field of Classification Search ................. 242/282, 242/283, 284; 74/545, 546, 547
See application file for complete search history.

(56) References Cited

U.S. PATENT DOCUMENTS

| | | | | |
|---|---|---|---|---|
| 3,967,791 A * | 7/1976 | Morishita | ................ | 242/268 |
| 5,984,220 A * | 11/1999 | Kawabe | ................ | 242/241 |
| 6,598,818 B2 * | 7/2003 | Tsutsumi | ................ | 242/263 |
| 6,626,385 B1 * | 9/2003 | Tsutsumi | ................ | 242/282 |
| 6,883,738 B2 * | 4/2005 | Nakajima et al. | ................ | 242/282 |
| 6,902,127 B2 * | 6/2005 | Nishikawa | ................ | 242/311 |
| 7,028,937 B2 * | 4/2006 | Hitomi et al. | ................ | 242/311 |
| 7,070,137 B2 * | 7/2006 | Nishikawa et al. | ................ | 242/282 |
| 7,163,168 B2 * | 1/2007 | Sugawara et al. | ................ | 242/284 |
| 7,232,087 B2 * | 6/2007 | Morise | ................ | 242/244 |

FOREIGN PATENT DOCUMENTS

| | | |
|---|---|---|
| EP | 0 803 191 A2 | 10/1997 |
| EP | 0 992 190 A1 | 4/2000 |
| EP | 1 413 195 A1 | 4/2004 |
| EP | 1 438 895 A1 | 7/2004 |
| JP | H10-004836 | 1/1998 |

* cited by examiner

*Primary Examiner*—Emmanuel M Marcelo
(74) *Attorney, Agent, or Firm*—Shinjyu Global IP (57) ABSTRACT

A spinning reel includes a reel unit, a rotation transmission mechanism, a handle assembly, a rotor, a spool shaft, an oscillating mechanism, and a spool. The reel unit includes a reel body that has a first opening, and a first lid member that covers the first opening. The rotation transmission mechanism includes a master gear shaft that is rotatably mounted to the reel unit, and a master gear that is disposed on the master gear shaft integrally rotatably about a first shaft axis X. The reel body includes a first rotation support portion that rotatably supports the master gear shaft on a master gear side of the spool shaft. The first lid member includes a second rotation support portion that rotatably supports the master gear shaft on a first lid member side of the master gear.

9 Claims, 3 Drawing Sheets

SPINNING REEL

CROSS-REFERENCE TO RELATED APPLICATIONS

This application claims priority under 35 U.S.C. § 119 to Japanese Patent Application No. 2006-234876 filed on Aug. 31, 2006. The entire disclosure of Japanese Patent Application No. 2006-234876 is hereby incorporated herein by reference.

BACKGROUND OF THE INVENTION

1. Field of the Invention

The present invention generally relates to a spinning reel. More specifically, the present invention relates to a spinning reel that is mounted on a fishing rod, and is capable of reeling out a fishing line in a forward direction.

2. Background Information

Conventionally, a spinning reel is mounted on a fishing rod, and reels out fishing line in a forward direction. The spinning reel includes a reel unit, a handle assembly, a rotor, and a spool. The reel unit is mounted on the fishing rod. The handle assembly is rotatably mounted to the reel unit. The rotor is rotated in cooperation with rotation of a handle assembly. The fishing line is wound around an outer periphery of the spool by rotation of the rotor. The rotation of the handle assembly is transmitted to the rotor via a rotation transmission mechanism. The rotation transmission mechanism includes a master gear shaft, a master gear, and a pinion gear. The master gear shaft is arranged along a left-and-right, first shaft axis direction. The master gear shaft is rotatably mounted to the reel unit. The master gear includes a plurality of face gear teeth on an outer periphery on an interior side surface of the master gear. The master gear rotates together with the master gear shaft about the first shaft axis. The pinion gear is arranged along a second shaft axis that is skew to the master gear shaft. The pinion gear meshes with the master gear. The handle assembly is non-rotatably mounted to the master gear. The spool is mounted to a fore end of a spool shaft that is arranged along a front-and-rear direction. The spool shaft is moved back and forth in cooperation with the rotation of the handle assembly by an oscillating mechanism.

In this type of spinning reel, generally, both ends of the master gear shaft are supported by the reel unit. The handle assembly can be coupled to either the left or right side of the master gear shaft. On the other hand, spinning reels designed specifically for a left or right handed user are also known in which the handle assembly is coupled only on the left or right side. The handle assembly is cantilevered by the reel unit, and the master gear shaft does not traverse the reel unit. See, for example, Japanese Patent Laid-Open Publication KOKAI No. HEI 10-004836.)

In the known spinning reel, the master gear is integrally formed at one end of the master gear shaft. The master gear shaft passes through and thus, is cantilevered by a cylindrical rotation support portion that is disposed on a lid member of the reel unit. The rotation support portion accommodates a pair of bearings that are spaced away from each other in the axial direction of the master gear shaft. Accordingly, the master gear is located on the interior side in the axial direction relative to the rotation support portion. Thus, the master gear shaft is not located on the interior side relative to the master gear, and does not traverse the reel unit. In this case, a slider of an oscillating mechanism is arranged to overlap the master gear in the front-and-rear direction. Consequently, in this spinning reel, the length of the reel unit in the front-and-rear direction is short. Therefore, it is possible to make the reel unit compact.

In the aforementioned known configuration, the master gear and the slider is arranged to overlap each other. Accordingly, the length of the reel unit in the front-and-rear direction is short. However, since the master gear is cantilevered, the support interval in the rotation support portion becomes wide. This elongates a protrusion that is provided to support the master gear shaft.

In view of the above, it will be apparent to those skilled in the art from this disclosure that there exists a need for an improved spinning reel that can minimize a protrusion that is provided to support the master gear shaft. This invention addresses this need in the art as well as other needs, which will become apparent to those skilled in the art from this disclosure.

SUMMARY OF THE INVENTION

It is an object of the present invention to provide a spinning reel that includes a master gear shaft that does not traverse a reel unit, and minimize a protrusion that is provided to support the master gear shaft.

A spinning reel according to a first aspect of the present invention includes a reel unit, a rotation transmission mechanism, a handle assembly, a rotor, a spool shaft, an oscillating mechanism, and a spool. The reel unit includes a reel body a first opening and a first lid member. The reel body is configured to be mounted on a fishing rod. The first opening is on a side surface of the reel body. The first lid member is configured to cover the first opening. The rotation transmission mechanism includes a master gear shaft, a master gear, and a pinion gear. The master gear shaft is arranged along a direction of a first shaft axis extending in a lateral direction and is rotatably mounted to the reel body and the first lid member. The master gear is integrally formed on the master gear shaft and rotatably disposed about the first shaft axis. The pinion gear is arranged along a direction of a second shaft axis extending in a longitudinal direction and is configured to mesh with a plurality of gear teeth of the master gear. The handle assembly is rotatably coupled to the master gear shaft. The rotor is rotatably mounted to the reel body about the second shaft axis. The rotation of the handle assembly is transmitted via the rotation transmission mechanism to the rotor. The spool shaft is movable relative to the reel body in the direction of the second shaft axis. The oscillating mechanism is configured to move the spool shaft back and forth in cooperation with the rotation of the handle assembly. The spool is mounted to a fore end of the spool shaft and is configured for fishing line to be wound around an outer peripheral surface of the spool by the rotation of the rotor. The reel body includes a first rotation support portion that rotatably supports the master gear shaft on a master gear side of the spool shaft. The first lid member includes a second rotation support portion that rotatably supports the master gear shaft on a first lid member side of the master gear.

In this spinning reel, the handle assembly is rotated in the line-winding direction, thus, the master gear rotates in cooperation with the rotation of the handle assembly. The rotation of the handle assembly is transmitted to the pinion gear via the master gear. Thus, the rotor rotates so that the fishing line is wound around the spool. In addition, when the handle assembly is rotated, the oscillating mechanism moves the spool shaft back and forth. Thus, the spool moves back and forth. Accordingly, the fishing line is wound on the spool substantially uniformly in the axial direction. The second rotation support portion that is disposed on the first lid member supports the handle assembly on the first lid member side relative to the master gear of the master gear shaft. The first rotation support portion that is disposed in the reel body supports the handle assembly on the reel body side relative to the master gear shaft. Consequently, both ends of the master gear shaft are supported at support points such that the master gear is interposed between the support points.

In this configuration, since the second support portion supports the master gear shaft on the master gear side relative to the spool shaft, the master gear does not protrude from the spool shaft toward the side opposite to the master gear. For this reason, the master gear is configured not to traverse the reel unit. Therefore, it is possible to make the reel unit compact. In addition, the master gear shaft is not cantilevered, but both ends of the master gear shaft are supported so that the master gear is interposed between the support points. Therefore, it is possible to minimize a protrusion that is provided to support the master gear shaft. Furthermore, a space between the bearings provided to support the master gear shaft is able to be extended. Therefore, it provides a minimized unsteadiness of the master gear shaft even when the amount of an outward protrusion of the present invention is the same as that of a cantilevered gear shaft.

The spinning reel according to a second aspect of the present invention is the reel according to the first aspect of the present invention, wherein the reel body has a second opening on the other side surface opposite to the first opening, and the reel unit further includes a second lid member that covers the second opening. In this configuration, since the reel body has the second opening, components such as the rotation transmission mechanism and the oscillating mechanism are assembled inside the reel body from the second opening side. Therefore, although the first rotation support portion is arranged on the first opening side of the reel body, the reel can be easily assembled.

The spinning reel according to a third aspect of the present invention is the reel according to the first or second aspect of the present invention, wherein the first and second rotation support portions include first and second bearing accommodation portions that accommodate first and second bearings, respectively, to rotatably support the master gear shaft.

The spinning reel according to a fourth aspect of the present invention is the reel according to the third aspect of the present invention, wherein the first bearing accommodation portion is an annular member that is opposed to the interior side surface of the master gear to be able to accommodate the first bearing, and the first rotation support portion further includes a pair of arms that extend from a pair of peripheral parts that are opposed to the first opening of the reel body toward the first bearing accommodation portion. In this configuration, since the first rotation support portion occupies a small area, components can be assembled inside the reel body from the first opening side.

The spinning reel according to a fifth aspect of the present invention is the reel according to any of the first to fourth aspects of the present invention, wherein the first rotation support portion is arranged radially inward of the gear teeth of the master gear to overlap the gear teeth in the direction of the first shaft axis. In this configuration, it is possible to minimize protrusion length of the master gear shaft toward the first rotation support portion, and, therefore, to minimize the width of the reel unit.

The spinning reel according to a sixth aspect of the present invention is the reel according to any of the first to fifth aspects of the present invention, wherein the master gear shaft is a cylindrical shaft that has a female threaded portion on the inner peripheral surface thereof. In addition to this, the handle assembly includes a handle shaft, a handle arm, and a handle grip. The handle shaft has a male threaded portion that is screwed into the female threaded portion. The handle arm is coupled integrally rotatably to the handle shaft, and extends in the radial direction of the handle shaft. The handle grip is mounted to the handle arm rotatably about a axis that is parallel to the handle shaft. In this configuration, since the handle assembly is screwed into and thus is fastened to the master gear, it is possible to suppress the wobble between the handle assembly and the master gear shaft.

The spinning reel according to a seventh aspect of the present invention is the reel according to any of the first to sixth aspects of the present invention, wherein the oscillating mechanism includes a worm shaft, a slide, a guide portion, and a gear-down train. The worm shaft is arranged in parallel to the spool shaft, and is provided with intersecting helical grooves that are formed on the outer peripheral surface thereof. The slider includes an engagement member that engages with the helical grooves, and receives the spool shaft that is coupled thereto immovably at least in the direction of the second shaft axis. The guide portion is arranged in parallel to the worm shaft, and guides the slider in the direction of the second shaft axis. The gear-down train reduces the rotation of the master gear, and transmits the rotation of the master gear to the threaded portion. In addition, the slider can be located at a position that overlaps the master gear shaft in the direction of the second shaft axis. In this configuration, the slider can pass by the end of the master gear shaft on the spool shaft side, accordingly, the frontward position of the slider in the back and forth movement can be located at a position where the slider overlaps the master gear shaft in the second shaft axis direction. Therefore, it is possible to make the reel compact.

According to the present invention, since the second support portion supports the master gear shaft on the master gear side relative to the spool shaft, the master gear shaft does not protrude from the spool shaft toward the side opposite to the master gear. For this reason, the master gear is configured not to traverse the reel unit. Therefore, it is possible to make the reel unit compact. In addition, the master gear shaft is not cantilevered, but both ends of the master gear shaft are supported to interpose the master gear between both ends. Therefore, it is possible to minimize a protrusion that is provided to support the master gear shaft.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION

A preferred embodiment of the present invention will now be explained with reference to the drawings. It will be apparent to those skilled in the art from this disclosure that the following description of the preferred embodiment of the present invention is provided for illustration only and not for the purpose of limiting the invention as defined by the appended claims and their equivalents.

Figure 1:
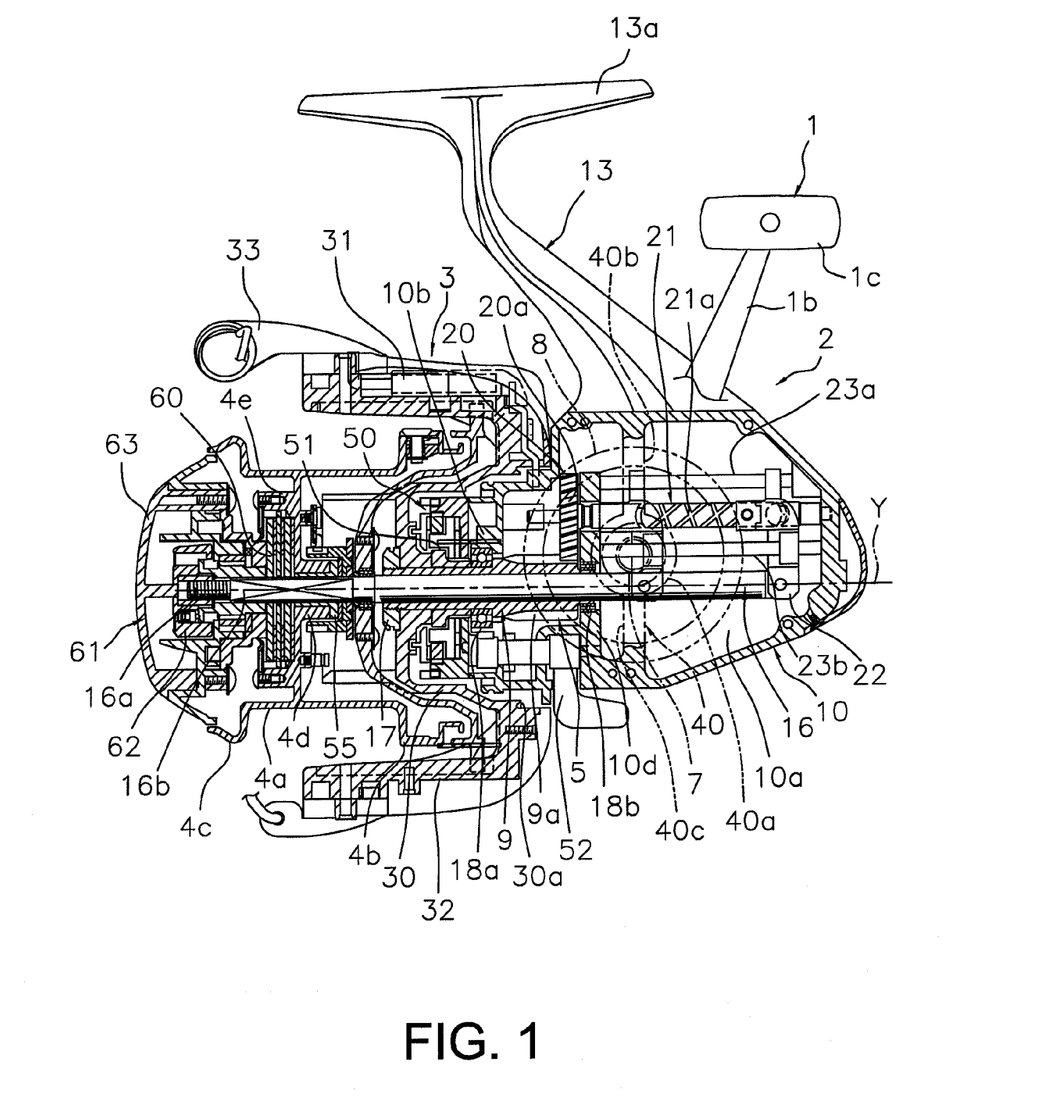
FIG. 1 is a partial side cross-sectional view of a spinning reel in which an embodiment of the present invention is adopted.
Figure 2:
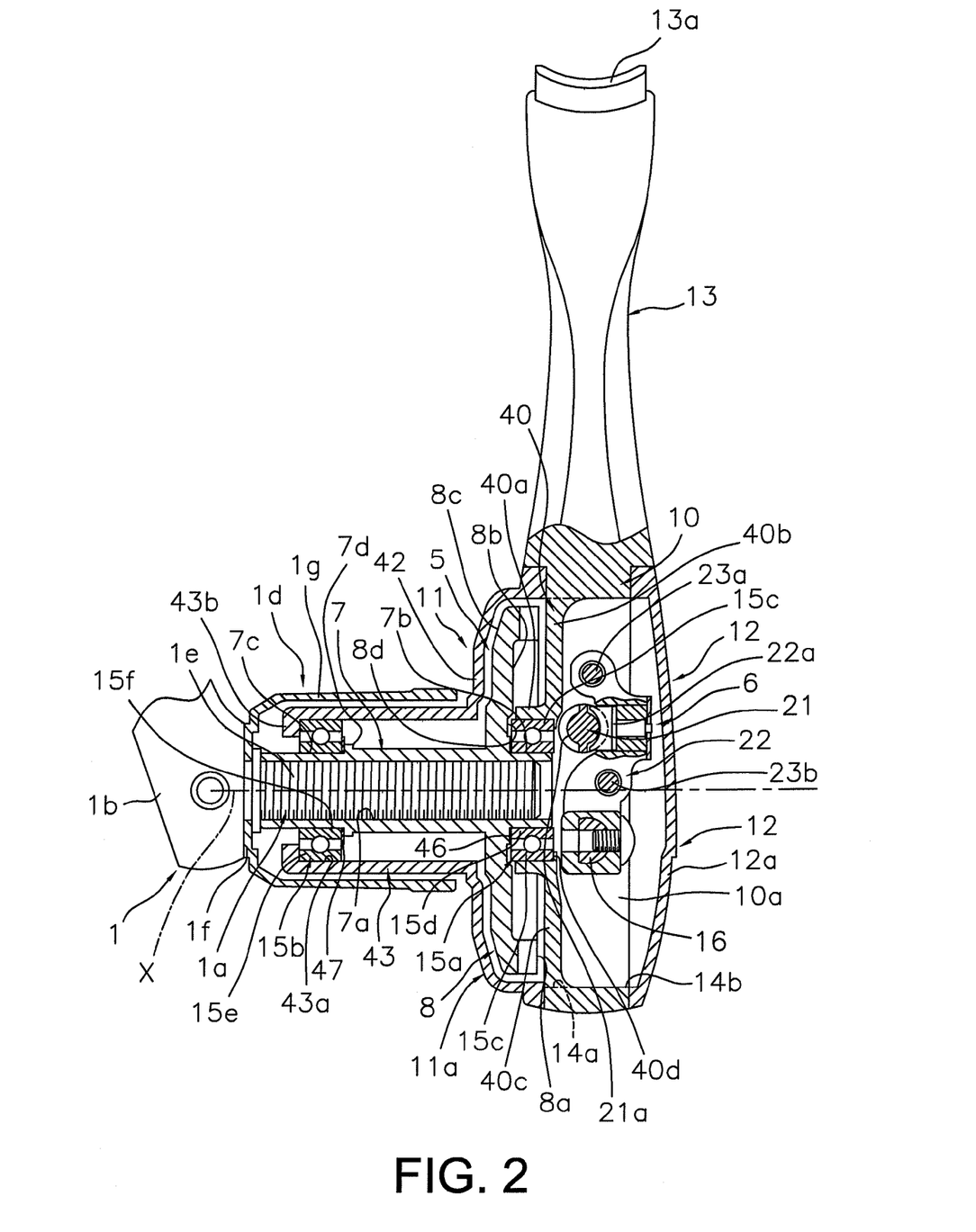
FIG. 2 is a partial back cross-sectional view of the spinning reel of FIG. 1.
Figure 3:
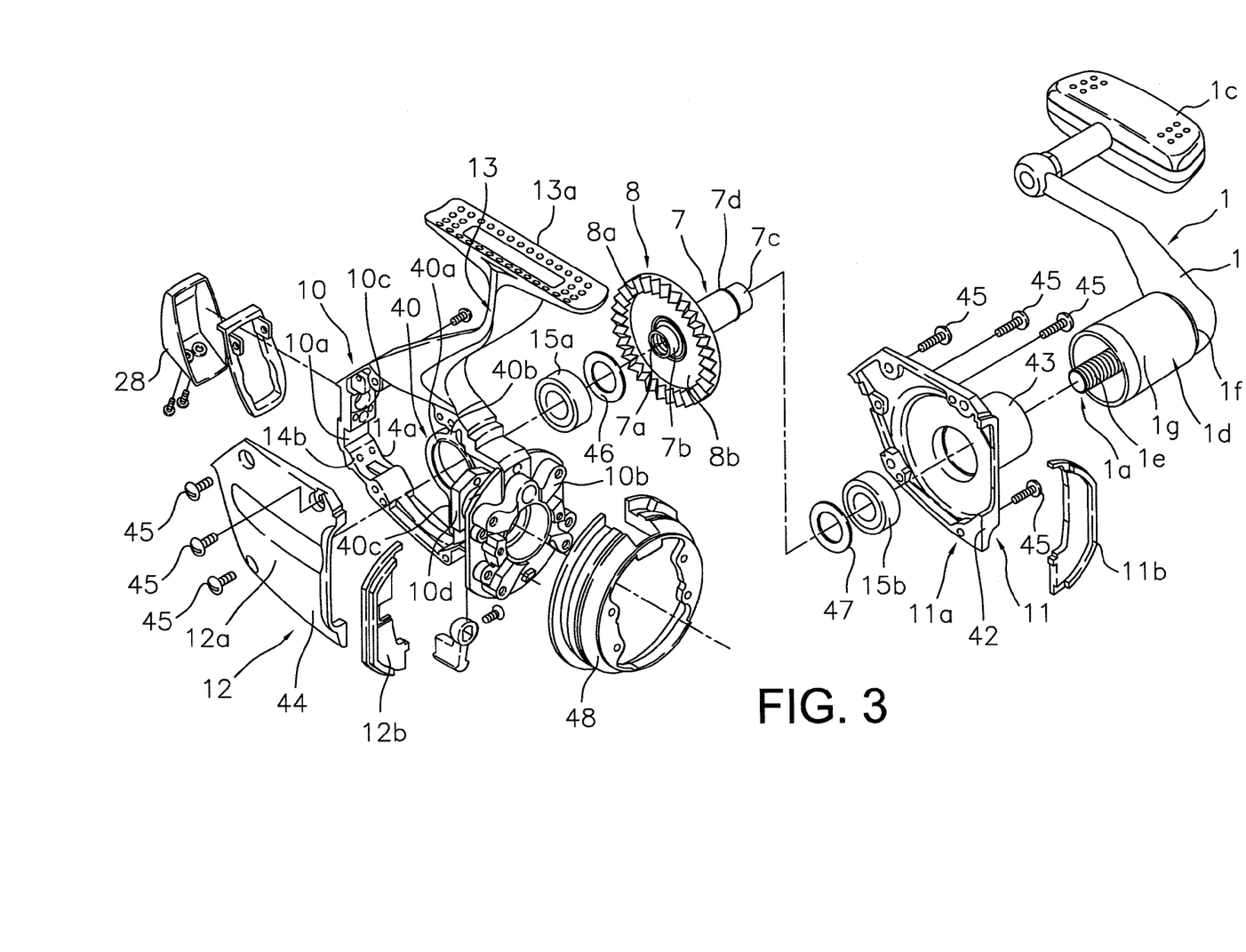
FIG. 3 is an exploded oblique view of a reel unit of the spinning reel of FIG. 1.

Referring to FIGS. 1 to 3, a spinning reel according to one embodiment of the present invention includes a handle assembly 1, a reel unit 2, a rotor 3, a spool 4, a rotation transmission mechanism 5, an oscillating mechanism 6 and a spool shaft 16. The reel unit 2 is configured to be mounted to a fishing rod. The rotor 3 is rotatably mounted on a front portion of the reel unit 2. The spool 4 is disposed on a front portion of the rotor 3. The spool 4 is mounted to a fore end of the spool shaft 16. The rotation transmission mechanism 5 transmits rotation of the handle assembly 1 to the rotor 3. The oscillating mechanism 6 moves the spool 4 back and forth in cooperation with the rotation of the handle assembly 1.

Handle Assembly Configuration

The handle assembly 1 includes a handle shaft 1a, a handle arm 1b, a handle grip 1c, and a shaft cover 1d. The handle shaft 1a is coupled to a master gear shaft 7 of the rotation transmission mechanism 5. The handle arm 1b is rotatably coupled to the handle shaft 1a, and extends in a radial direction of the handle shaft 1a. The handle grip 1c is rotatably mounted to the handle arm 1b about a shaft axis that is parallel to the handle shaft 1a. The shaft cover 1d is rotatably mounted to an outer periphery of a tip (left end in FIG. 2) of the handle shaft 1a. The outer peripheral surface of the handle shaft 1a is provided with a male-threaded portion 1e that is threaded into the master gear shaft 7. The handle arm 1b is rotatably coupled to the base end of the handle shaft 1a. The handle grip 1c has a T-shape that fits with a user's palm. The shaft cover 1d has a closed-ended cylindrical member that includes a disk portion 1f, and a cylindrical portion 1g. The disk portion 1f is rotatably coupled to the tip of the handle shaft 1a. The cylindrical portion 1g extends from the disk portion 1f toward the reel unit 2.

Reel Unit Configuration

The reel unit 2 accommodates the rotation transmission mechanism 5, and the oscillating mechanism 6 in the interior thereof. As shown in FIG. 3, the reel unit 2 includes a housing unit (as one example of a reel body) 10, first and second lid members 11 and 12, a rod-attachment portion 13, and a cover member 28. The housing unit 10 has first and second openings 14a and 14b on both lateral sides thereof. The first and second lid members 11 and 12 close first and second openings 14a and 14b, respectively. The rod-attachment portion 13 is formed integrally with the housing unit 10. The cover member 28 covers the housing unit 10 and the first and second lid members 11 and 12 from the rear. The first and second lid members 11 and 12 and the cover member 28 are detachably attached to the housing unit 10 by bolts.

An anodic oxide film is formed on a surface of the housing unit 10. The housing unit 10 is made of, for example, a magnesium alloy, which is lightweight and capable of maintaining a specific strength. The housing unit 10 is a frame-shaped member with an opening that forms an accommodation space 10a, which serves to accommodate and support the rotation transmission mechanism 5 and the oscillating mechanism 6. The housing unit 10 has a substantially uniform depth dimension. The housing unit 10 includes a disk-shaped mechanism support portion 10b, a rear support portion 10c and an intermediate support portion 10d. The mechanism support portion 10b is formed at a front surface of the housing unit 10. The rear support portion 10c supports the oscillating mechanism 6. The rear support portion 10c is formed at a rear portion of the housing unit 10. The intermediate support portion 10d is formed to extend upward from a lower portion at a rear part of the mechanism support portion 10b.

The reel unit 1 further includes a first rotation support portion 40 that is formed on the side of the first opening 14a. The first rotation support portion 40 is arranged to connect the upper and lower portion of the housing unit 10. The first rotation support portion 40 serves to rotatably support the master gear shaft 7 on a master gear side of the spool shaft 16. The first rotation support portion 40 rotatably supports a base end (right end in FIG. 2) of the master gear shaft 7. The first rotation support portion 40 includes an annular first bearing accommodation portion 40a, a pair of rod-shaped arms 40b and 40c, and a first positioning protrusion 40d, as shown in FIGS. 1 to 3. A first rolling-element bearing 15a is accommodated in an inner peripheral surface of the first bearing accommodation portion 40a. The arms 40b and 40c extend from opposed peripheral portions of the first opening 14a of the housing unit 10 toward the first bearing accommodation portion 40a. The first positioning protrusion 40d contacts an outer race 15c of the first rolling-element bearing 15a. The first positioning protrusion 40d is formed on an interior side of the first bearing accommodation portion 40a to inwardly protrude in the radial direction with an annular shape. Although, in this embodiment, the first rotation support portion 40 is formed integrally with the housing unit 10, it will be apparent to one of ordinary skill in the art from this disclosure that the first rotation support portion 40 may be a separate member that is detachably attached to the housing unit 10.

The first lid member 11 is made of an aluminum alloy, for example, that can maintain high specific strength and corrosion resistance. The first lid member 11 is formed so as to cover the first opening 14a of the housing unit 10. The first lid member 11 is, as shown in FIGS. 2 and 3, arranged adjacent to the master gear 8. The first lid member 11 includes a first cover portion 42, a first lid body 11a, and a first lid flange 11b. The first cover portion 42 covers the master gear 8. The first lid body 11a includes a second rotation support portion 43 that protrudes from the first cover portion 42 outward in the axial direction of the master gear shaft 7. The first lid flange 11b is mounted at a front part of the first lid body 11a.

The second rotation support portion 43 serves to rotatably support the master gear shaft 7 on the first lid member 11 side relative to the master gear 8. The second rotation support portion 43 rotatably supports a tip of the master gear shaft 7. The second rotation support portion 43 is formed in a cylindrical shape through which the master gear shaft 7 can pass. The cylindrical portion 1g covers the second rotation support portion 43. The second rotation support portion 43 includes a second bearing accommodation portion 43a and a second positioning protrusion 43b. The second bearing accommodation portion 43a accommodates a second rolling-element bearing 15b. The second bearing accommodation portion 43a is formed at an end of the second rotation support portion 43. The second positioning protrusion 43b contacts an outer race 15e of the second rolling-element bearing 15b. The second positioning protrusion 43b is formed on an interior of the second rotation support portion 43 and inwardly protrudes in the radial direction with an annular shape. The second rotation support portion 43 rotatably supports the master gear shaft 7 on a first lid member side of the master gear 8.

The second rotation support portion 43 is formed in a cylindrical shape to be spaced away from the first rotation support portion 40 but in a case where the second rotation support portion is arranged close to the back surface of the master gear 8, the second rotation support portion may not be formed in a cylindrical shape.

In this embodiment, the first and second rolling-element bearings 15a and 15b are ball bearings with the same size. It will be apparent to one of ordinary skill in the art from this disclosure that the master gear shaft 7 may be supported by sliding bearings such as bushings, or rolling-element bearings such as roller bearings instead of or in addition to the first and second rolling-element bearings 15a and 15b.

Although the first and second rolling-element bearings 15a and 15b are ball bearings with the same size for the sake of easy replacement, it will be apparent to one of ordinary skill in the art from this disclosure that the first rolling-element bearing 15a that is arranged close to the master gear 8 may have a load-carrying capacity larger than the second rolling-element bearing 15b.

The second lid member 12 is a member that has a generally mirror image relationship with the first lid member 11 except for the second rotation support portion 43. The second lid member 12 includes a second lid body 12a, and a second lid flange 12b. The second lid body 12a includes a second cover portion 44. The second lid flange 12b is mounted at a front part of the second lid body 12a. Since the second lid member 12 does not support the master gear shaft 7, a large force is unlikely to be applied to the second lid member 12. Accordingly, in order to achieve weight reduction, the second lid member 12 is made of a synthetic resin, such as nylon 66.

The first and second lid members 11 and 12 are fastened to the housing unit 10 by a plurality of fastening screws 45 in the form of round-head screws, for example. It will be apparent to one of ordinary skill in the art from this disclosure that the first and second lid members 11 and 12 can be fastened by various means. For example, the first and second lid members 11 and 12 may be fastened by screws passing from one of the first and second lid members 11 and 12 to the other of the first and second lid members 11 and 12 through the housing unit 10.

The reel unit 2 includes the first and second lid members 11 and 12, and the housing unit 10, but the present invention is not limited to this structure. For example, the reel unit 2 can be configured in a structure in which the housing unit 10 and the second lid member 12 are integrally formed as a unitary element. In this case, the first rotation support portion may not be formed integrally with the housing unit 10, and be formed as a separated element.

The rod-attachment portion 13 is a T-shaped member extending upward from the housing unit 10. The rod-attachment portion 13 has a reel foot 13a formed on a tip thereof. The reel foot 13a extends longitudinally and is mountable onto a reel seat (not shown) of a fishing rod.

In addition, the reel unit 2 includes a flange portion 48 that covers the mechanism support portion 10b from the front.

Rotation Transmission Mechanism Configuration

The rotation transmission mechanism 5 includes the master gear shaft 7, the master gear 8, and the pinion gear 9. Referring to FIG. 2, the master gear shaft 7 is rotatably mounted to the reel unit 2 along a first shaft axis X that runs left to right. The master gear 8 is disposed on the master gear shaft 7 and rotates about the first shaft axis X. Referring to FIG. 1, the pinion gear 9 is arranged along a second shaft axis Y that runs front to back. The pinion gear 9 meshes with the master gear 8.

The master gear shaft 7 is a hollow shaft member made of stainless steel or an aluminum alloy, for example. The master gear shaft 7 has a female-threaded portion 7a, a first mounting portion 7b, a second mounting portion 7c and a third positioning protrusion 7d. The female-threaded portion 7a is formed on an inner peripheral surface of the master gear shaft 7. The female-threaded portion 7a extends over a length of the master gear shaft 7 and preferably, over the whole length of the master gear shaft 7. The male-threaded portion 1e of the handle shaft 1a is threaded into the female-threaded portion 7a. The base end (right end in FIG. 2) of the master gear shaft 7 is located on a master gear side of the spool shaft 16. The first rolling-element bearing 15a is mounted to the first mounting portion 7b.

The second mounting portion 7c is formed on a tip or an exterior side (left side in FIG. 2) in the first shaft axis X direction of the master gear shaft 7. The second rolling-element bearing 15b is mounted to the second mounting portion 7c. The third positioning protrusion 7d is formed on an interior side of the second mounting portion 7c to outwardly protrude in the radial direction with an annular shape. An inner race 15f of the second rolling-element bearing 15b is disposed on an outer periphery of the second mounting portion 7c. An adjustment washer 47 is interposed between the inner race 15f of the second rolling-element bearing 15b and the third positioning protrusion 7d. The first and second mounting portions 7b and 7c have a diameter smaller than a portion of the master gear shaft 7 disposed between the first and second mounting portions 7b and 7c. Thus, the first and second bearings 15a and 15b are disposed in the first and second rotation support portions 40 and 43, respectively. The master gear 8 is disposed between the first and second bearings 15a and 15b.

The master gear 8 is a disk shaped member that includes a plurality of gear teeth 8a in the form of a face gear, an interior side surface 8b, an exterior side surface 8c, and an escaping portion 8d. In this embodiment, the master gear 8 is integrally formed with the master gear shaft 7. However, it will be apparent to one of skill in the art from this disclosure that the master gear 8 and the master gear shaft 7 can be formed separately as long as the master gear 8 and the master gear shaft 7 rotate together in an integrated manner as a unit. The first cover portion 42 is opposed to the exterior side surface 8c. The gear teeth 8a protrude axially inward toward the first rotation support portion 40 of the housing unit 10. The gear teeth 8a are arranged on an outer edge of the interior side surface 8b of the master gear 8. A face of the first bearing accommodation portion 40a opposes an interior side surface 8b (right side in FIG. 2) of the master gear 8. The escaping portion 8d is recessed on the interior side surface (right side surface in FIG. 2) 8b of the master gear 8 to prevent contact with the outer race 15c of the first rolling-element bearing 15a. In addition, an adjustment washer 46 is interposed between an inner race 15d of the first rolling-element bearing 15a and a stepped portion on the interior side surface 8b of the master gear 8. The adjustment washers 46 and 47 are provided to adjust the meshing between the master gear 8 and the pinion gear 9.

The master gear shaft 7 slightly protrudes from a center of the interior side surface 8b to provide the first mounting portion 7b so that the first rolling-element bearing 15a can be mounted to the master gear shaft 7. Thus, the first rolling-element bearing 15a is arranged radially inward of the gear teeth 8a. The first rolling-element bearing 15a extends past the gear teeth 8a in the first shaft axis X direction.

As shown in FIG. 1, the pinion gear 9 is a hollow tubular member with a front portion that passes through the rotor 3 and is non-rotatably mounted to the rotor 3. The spool shaft 16 passes through an inner circumference of the pinion gear 9. A nut 17 is fitted to a front part of the pinion gear 9. The rotor 3 is non-rotatably coupled to the pinion gear 9 by the nut 17. The pinion gear 9 is rotatably supported by a bearing 18a at a mid-portion of the pinion gear 9 and by a bearing 18b at a rear end portion of the pinion gear 9. The bearing 18a is fitted to the mechanism support portion 10b of the housing unit 10 and the bearing 18b is fitted to the intermediate support portion 10d of the housing unit 10. The pinion gear has a gear portion 9a that is formed on a rear end side of the pinion gear 9. The gear portion 9a meshes with the master gear 8.

Since the first rotation support portion 40 supports the master gear shaft 7 on a master gear side of the spool shaft 16, the master gear shaft 7 does not protrude on a side of the spool shaft 16 opposite the master gear 8. The master gear shaft 7 is configured not to traverse the reel unit 2 and thus, it is possible to make the reel unit 2 compact. In addition, the master gear shaft 7 is not cantilevered. Rather, the master gear shaft 7 is supported on both sides of the master gear 8. Therefore, it is possible to minimize a protrusion that is provided to support the master gear shaft 7.

Oscillating Mechanism Configuration

The oscillating mechanism 6 includes, as shown in FIGS. 1 and 2, a gear-down train 20, a worm shaft 21, a slider 22, and first and second guide shafts 23a and 23b. The gear-down train 20 meshes with the pinion gear 9 and reduces the rotation of the master gear shaft 7. The worm shaft 21 rotates in cooperation with the gear-down train 20. The slider 22 engages with the worm shaft 21 and moves back and forth. The first and second guide shafts 23a and 23b guide the slider 22 in the spool shaft direction.

The gear-down train 20 includes a follower gear 20a, and a stepped gear (not shown). The follower gear 20a is non-rotatably coupled to a fore end of the worm shaft 21. The stepped gear includes a small gear that meshes with the follower gear 20a and a large gear that meshes with the pinion gear 9. Thus, the rotation of the master gear shaft 7 is greatly reduced, and is transmitted via the pinion gear 9 to the worm shaft 21.

The worm shaft 21 has intersecting helical grooves 21a formed thereon. The worm shaft 21 is disposed parallel to the spool shaft 16. The worm shaft 21 is rotatably mounted on the front and rear ends of the housing unit 10 via bearings made of, for example, a synthetic resin. The worm shaft 21 is disposed above the spool shaft 16.

The slider 22 has an engaging member 22a that engages with the grooves 21a of the worm shaft 21. The slider 22 is coupled to the rear end of the spool shaft 16. The slider 22 is immovable relative to the spool shaft 16. Although, in this embodiment, the slider 22 is non-rotatably coupled to the rear end of the spool shaft 16, in the case of a rear drag type spinning reel, the slider 22 is rotatably coupled but immovable relative to the spool shaft 16. With a tip of the engaging member 22a engaging the grooves 21a, the slider 22 moves back and forth in the spool shaft direction in accordance with rotation of the worm shaft 21, and moves the spool shaft 16 back and forth in cooperation with rotation of the handle assembly 1. Since the master gear shaft 7 does not penetrate the reel unit 2, and the base end of the master gear shaft 7 is arranged on the master gear side of the spool shaft 16, the slider 22 can pass by the base end of the master gear shaft 7 along the second shaft axis Y direction. Accordingly, the frontward position of the slider 22 in the back and forth movement can be located at a position where the slider 22 overlaps the master gear shaft 7 in the second shaft axis Y direction. As a result, the region of movement of the slider 22 is shifted frontward as compared with conventional reels. Thus, the rear part of the reel unit 2 is located frontward as compared with conventional reels. Therefore, it is possible to make the spinning reel compact.

The first and second guide shafts 23a and 23b pass through the slider 22 and guide the slider 22 along the spool shaft 16. The first guide shaft 23a is fixed at both ends to a rear end of the housing unit 10 and to the intermediate support portion 10d of the housing unit 10. The second guide shaft 23b is also fixed at both ends to the rear end of the housing unit 10 and to the intermediate support portion 10d of the housing unit 10. The worm shaft 21 is disposed between the first and second guide shafts 23a and 23b. The second guide shaft 23b is arranged above the spool shaft 16. Thus, the first guide shaft 23a, the worm shaft 21, the second guide shaft 23b and the spool shaft 16 are arranged top to bottom in that order. In particular, referring to FIG. 2, the worm shaft 21 and the spool shaft 16 are arranged top-to-bottom and overlap each other in a radial direction. In addition, the first guide shaft 23a and the worm shaft 21 are arranged top-to-bottom and overlap each other in a radial direction. The second guide shaft 23b and the spool shaft 16 are arranged top-to-bottom and overlap each other in a radial direction. Accordingly, four shafts 23a, 21, 23b and 16 are arranged in a narrow space that has a short transverse length. Therefore, it is possible to make the thickness (width) of the reel unit 2 small.

Additionally, since the master gear shaft 7 does not traverse the reel unit 2, the need for taking into consideration the interference between the master gear shaft 7 and these shafts 23a, 21, 23b and 16 is eliminated. For this reason, the height of the reel unit 2 can be small. Therefore, it is possible to make the reel unit 2 compact.

Configuration of Other Elements

As shown in FIG. 1, the rotor 3 includes a cylindrical portion 30, and first and second rotor arms 31 and 32. The cylindrical portion 30 is rotatably mounted to the reel unit 2 via the pinion gear 9. The first and second rotor arms 31 and 32 are spaced at an interval away from the cylindrical portion 30 and extend frontward while being opposed to each other from a rear end of the cylindrical portion 30. The cylindrical portion 30 has a hollow 30a that is formed in a rear part of the cylindrical portion 30 to accommodate the mechanism support portion 10b and an anti-reverse mechanism 50 of the reel unit 2. The flange portion 48 is arranged to close the hollow 30a. A bail arm 33 is mounted to a fore end of the first rotor arm 31 to guide the fishing line to the spool 4. The bail arm 33 is pivotably mounted between a line-winding position that guides the fishing line to the spool 4 and a line-reeling-out position that can reel out the fishing line from the spool 4.

The anti-reverse mechanism 50 prohibits or permits the rotation of the rotor 3 in the line reel-releasing direction. The anti-reverse mechanism 50 includes a roller-type one-way clutch 51 fitted to the mechanism support portion 10b of the housing unit 10. The one-way clutch 51 is switched between a reverse-rotation-prohibited state and a reverse-rotation-permitted state. The anti-reverse mechanism 50 further includes a switching operation unit 52 for switching the one-way clutch 51 between the reverse-rotation-prohibited state and the reverse-rotation-permitted state. The switching operation unit 52 is pivotably supported by the mechanism support portion 1 Ob and the intermediate support portion 10d of the housing unit 10.

The spool 4 is disposed between the first rotor arm 31 and the second rotor arm 32 of the rotor 3. The spool 4 is mounted on the front end of the spool shaft 16 so as to rotate in a state in which the rearward movement of the spool 4 is restricted. The spool shaft 16 has a stepped portion such that a diameter of the spool shaft 16 gradually decreases toward the front end of the spool shaft 16. The spool shaft 16 includes a first male screw 16a and mutually parallel chamfered portions 16b. The male screw 16a is formed on a small diameter portion on the front end of the spool shaft 16. The first male screw 16a is a single thread screw. In addition, the chamfered portions 16b are provided to the rear of the first male screw 16a. The spool 4 is braked by a drag mechanism 60.

The spool 4 is made of, for example, an aluminum alloy. The spool 4 includes a bobbin 4a, a large diameter skirt portion 4b, a small diameter front flange portion 4c, and a tubular drag accommodation portion 4e. The fishing line is wound around an outer periphery of the bobbin 4a. The skirt portion 4b is unitarily formed with a rear part of the bobbin 4a. The front flange portion 4c is unitarily formed with a front part of the bobbin 4a. The bobbin 4a is a cylindrical member that extends to outer peripheral sides of the cylindrical portion 30 of the rotor 3. The bobbin 4a includes a disk-shaped mounting portion 4d in which a boss portion is formed. The spool shaft 16 is mounted in an inner peripheral side of the boss portion. The mounting portion 4d is rotatably mounted on the spool shaft 16 via a brimmed bushing 55. The drag accommodation portion 4e accommodates the drag mechanism 60 that brakes the spool 4. The drag accommodation portion 4e is formed at a front surface of the mounting portion 4d.

The drag mechanism 60 has a drag adjustment knob 61 for adjusting drag force. The drag adjustment knob 61 meshes with the spool shaft 16. In this embodiment, the drag adjustment knob 61 includes first and second adjustment units 62 and 63. The first adjustment unit 62 adjusts an initial drag force. The second adjustment unit 63 adjusts a drag force that increases from the initial drag force. In the drag adjustment knob 61, an initial load of the drag force is set by rotating the first adjustment unit 62. Then, with the initial drag force set, the drag force is increased from the initial drag force by the second adjustment unit 63. This allows the user to prevent a fish from escaping and the fishing line from breaking due to the drag force being set to a level lower than necessary.

Handling and Operation of the Reel

With this spinning reel, the drag force of the spinning reel will be adjusted before fishing in accordance with the fishing method and the type of fish that the user is attempting to catch. When the drag force is to be adjusted, the first adjustment unit 62 is first rotated to set the initial drag force. When the initial drag force has been set, the second adjustment unit 63 is rotated to set the usual drag force used when a fish has been caught.

When casting with the spinning reel, the bail arm 33 is pushed over from the line-winding position to the line-reeling-out position. Then, the fishing rod is swung and the tackle is cast out. When this occurs, the fishing line is released in a helical fashion from the front part of the spool 4.

When the fishing line is to be wound onto the spool 4, the bail arm 33 is returned to the line-winding position. This is performed automatically by a cam and a spring (not shown) when the handle assembly 1 is rotated in the line winding direction. When the handle assembly 1 is rotated in the line winding direction, a rotational force is transmitted to the pinion gear 9 via the master gear shaft 7 and the master gear 8. The rotational force transmitted to the pinion gear 9 is transmitted to the rotor 3 via the front part of the pinion gear 9 and the rotor 3 rotates in the line winding direction.

In addition, the rotational force is transmitted from the pinion gear 9 to the worm shaft 21 via the gear-down train 20. As a result, the worm shaft 21 rotates at the rotational speed of the pinion gear 9, i.e., a rotation speed that is less than the rotational speed of the rotor 3. The rotation of the worm shaft 21 causes the slider 22 that meshes with the grooves 21a of the worm shaft 21 to move forward and backward, guided by the first and second guide shafts 23a and 23b. The fishing line that is guided onto the spool 4 by the bail arm 33 is wound onto the bobbin 4a of the spool 4. When the fishing line is wound in the conventional cantilevered support configuration, the winding force (winding torque) acts on a master gear shaft as a bending force. On the other hand, in this embodiment, since both ends of the master gear shaft 7 are supported, the winding force does not act as a bending force. Thus, even a narrow interval can maintain the strength at high level. Therefore, it is possible to minimize a protrusion that is provided to support the master gear shaft 7.

In the foregoing embodiment, a front drag type spinning reel is used as an exemplary spinning reel, but the present invention can also be applied to all spinning reels, such as spinning reels that do not have a bail arm, lever-brake type spinning reels, and rear drag type spinning reels.

As used herein, the following directional terms "forward, rearward, above, downward, vertical, horizontal, below and transverse" as well as any other similar directional terms refer to those directions of a device equipped with the present invention. Accordingly, these terms, as utilized to describe the present invention should be interpreted relative to a device equipped with the present invention.

The terms of degree such as "substantially", "about" and "approximately" as used herein mean a reasonable amount of deviation of the modified term such that the end result is not significantly changed.

While only preferred embodiment has been chosen to illustrate the present invention, it will be apparent to those skilled in the art from this disclosure that various changes and modifications can be made herein without departing from the scope of the invention as defined in the appended claims. Furthermore, the foregoing description of the embodiment according to the present invention is provided for illustration only, and not for the purpose of limiting the invention as defined by the appended claims and their equivalents. Thus, the scope of the invention is not limited to the disclosed embodiment.

What is claimed is:

1. A spinning reel comprising:
    a reel unit including a reel body configured to be mounted on a fishing rod, a first opening on a side surface of the reel body, and a first lid member configured to cover the first opening;
    a rotation transmission mechanism including a master gear shaft arranged along a direction of a first shaft axis extending in a lateral direction and rotatably mounted to the reel body and the first lid member, a master gear arranged on the master gear shaft and rotatably disposed about the first shaft axis, and a pinion gear arranged along a direction of a second shaft axis extending in a longitudinal direction and configured to mesh with a plurality of gear teeth of the master gear;
    a handle assembly rotatably coupled to the master gear shaft;
    a rotor rotatably mounted to the reel body about the second shaft axis, the rotation of the handle assembly being transmitted via the rotation transmission mechanism to the rotor;
    a spool shaft movable relative to the reel body in the direction of the second shaft axis;
    an oscillating mechanism configured to move the spool shaft back and forth in cooperation with the rotation of the handle assembly; and
    a spool mounted to a fore end of the spool shaft and configured for a fishing line to be wound around an outer peripheral surface of the spool by the rotation of the rotor, the reel body including a first rotation support portion that rotatably supports a portion of the master gear shaft between an interior side surface of the master gear and the inner side of the outer peripheral surface of the spool shaft, and the first lid member including a second rotation support portion that rotatably supports the master gear shaft on a first lid member side of the master gear.

2. The spinning reel set forth in claim 1, wherein the reel unit further includes a second opening on a side surface opposite to the first opening, and a second lid member that is configured to cover the second opening.

3. The spinning reel set forth in claim 1, wherein the first and second rotation support portions include first and second bearing accommodation portions configured to accommodate bearings that rotatably support the master gear shaft.

4. The spinning reel set forth in claim 3, wherein the first bearing accommodation portion is annular and is opposed to an interior side surface of the master gear.

5. The spinning reel set forth in claim 4, wherein the first rotation support portion further includes a pair of arms that extend from opposed peripheral portions of the first opening toward the first bearing accommodation portion.

6. The spinning reel set forth in claim 1, wherein the first rotation support portion is arranged radially inward of the gear teeth of the master gear and overlap the gear teeth in the direction of the first shaft axis.

7. The spinning reel set forth claim 1, wherein the master gear shaft is cylindrical and has a female threaded portion on an inner peripheral surface thereof.

8. The spinning reel set forth in claim 7, wherein the handle assembly includes
a handle shaft with a male threaded portion that is screwed into the female threaded portion,
a handle arm rotatably coupled to the handle shaft and extending in a radial direction of the handle shaft, and
a handle grip rotatably mounted to the handle arm about an axis that is parallel to the handle shaft.

9. The spinning reel set forth in claim 1, wherein the oscillating mechanism includes
a worm shaft that is arranged in parallel to the spool shaft and is provided with intersecting helical grooves that are formed on an outer peripheral surface thereof,
a slider that includes an engagement member that engages with the helical grooves, and that is immovably coupled in the direction of the second shaft axis relative to the spool shaft,
a guide portion that is arranged in parallel to the worm shaft and guides the slider in the direction of the worm shaft, and
a gear-down train that reduces the rotation of the master gear and transmits the rotation of the master gear to the threaded portion, wherein
the slider can be disposed at a position that overlaps the master gear shaft in the direction of the second shaft axis.

* * * * *